(12) United States Patent
Sone

(10) Patent No.: US 11,142,091 B2
(45) Date of Patent: Oct. 12, 2021

(54) SERIES POWER STORAGE DUAL VOLTAGE POWER SUPPLY DEVICE

(71) Applicant: HONDA MOTOR CO., LTD., Tokyo (JP)

(72) Inventor: Toshihiro Sone, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 102 days.

(21) Appl. No.: 16/563,968

(22) Filed: Sep. 9, 2019

(65) Prior Publication Data
US 2020/0083731 A1    Mar. 12, 2020

(30) Foreign Application Priority Data

Sep. 12, 2018   (JP) .............................. JP2018-170515

(51) Int. Cl.
*B60L 58/20*      (2019.01)
*H02M 3/158*      (2006.01)
*H02J 7/00*       (2006.01)
*H02M 1/00*       (2006.01)

(52) U.S. Cl.
CPC ........... *B60L 58/20* (2019.02); *H02M 3/1584* (2013.01); *H02J 7/0063* (2013.01); *H02M 1/007* (2021.05); *H02M 3/158* (2013.01); *H02M 3/1586* (2021.05)

(58) Field of Classification Search
CPC .............. B60L 58/18–22; B60R 16/033; H02J 7/1423; H02M 2001/007; H02M 2003/1586
See application file for complete search history.

(56) References Cited

U.S. PATENT DOCUMENTS

| | | | | |
|---|---|---|---|---|
| 5,528,122 A | * | 6/1996 | Sullivan ................ | H02J 7/0018 320/118 |
| 2002/0167291 A1 | * | 11/2002 | Imai ...................... | H02J 7/1423 320/119 |
| 2012/0038214 A1 | * | 2/2012 | King ...................... | B60L 58/18 307/77 |
| 2012/0187887 A1 | * | 7/2012 | Sone ...................... | B60L 58/20 318/504 |

(Continued)

FOREIGN PATENT DOCUMENTS

| | | |
|---|---|---|
| JP | 2015-085707 | 5/2015 |
| WO | 2014-203602 | 12/2014 |

*Primary Examiner* — Hal Kaplan
*Assistant Examiner* — David A Shiao
(74) *Attorney, Agent, or Firm* — Amin, Turocy & Watson, LLP

(57) ABSTRACT

A power supply device includes: a first power storage device; a second power storage device that outputs voltage higher than the output voltage of the first power storage device and is connected in series to the first power storage device; a voltage converter connected to the output terminal of the first power storage device to output converted voltage; a second load connected to the output terminal of the voltage converter; and a control unit that controls the voltage converter at fixed boost ratio such that the converted voltage is the sum of the output voltage of the first power storage device and output voltage of the second power storage device. The output terminal of the first power storage device is connected to the second power storage device. The output terminal of the second power storage device is connected to the output terminal of the voltage converter.

4 Claims, 10 Drawing Sheets

(56) References Cited

U.S. PATENT DOCUMENTS

| | | | |
|---|---|---|---|
| 2012/0286569 A1* | 11/2012 | Pischke | H02J 1/08 307/10.1 |
| 2016/0134157 A1 | 5/2016 | Maeno et al. | |
| 2018/0323638 A1* | 11/2018 | Eriksson | B60L 58/20 |
| 2019/0058411 A1* | 2/2019 | Kitamoto | B60L 50/75 |
| 2019/0181766 A1* | 6/2019 | Ge | H02M 1/14 |
| 2019/0283625 A1* | 9/2019 | Eriksson | H02J 7/0014 |
| 2019/0359081 A1* | 11/2019 | Erhart | H02J 7/0014 |

* cited by examiner

SERIES POWER STORAGE DUAL VOLTAGE POWER SUPPLY DEVICE

BACKGROUND

Technical Field

The present invention relates to a power supply device.

Priority is claimed on Japanese Patent Application No. 2018-170515, filed Sep. 12, 2018, the contents of which are incorporated herein by reference.

Background Art

Conventionally, a power supply system is known which supplies power to an auxiliary load without damaging the EV travel power (see, for example, Japanese Unexamined Patent Application, First Publication No. 2015-085707, hereinafter referred to as Patent Document 1). In the technology described in Patent Document 1, a solar DC/DC converter is used for power supply from a solar battery to a 12V system, and a DC/DC converter is used for power supply from a main battery to an accessory load.

By the way, in the technology described in Patent Document 1, an auxiliary battery for storing electric power supplied to an auxiliary load and a main battery for storing electric power used for EV travel are separately provided, and electric power stored in the auxiliary battery is not used for EV driving. Therefore, in the technology described in Patent Document 1, it is necessary to sufficiently increase the capacity of the main battery, and the main battery becomes large.

Also, conventionally, a charge control device is known that charges power storage device with the power generated by a solar cell (see, for example, PCT International Publication No. WO 2014/203602, hereinafter referred to as Patent Document 2). In the technology described in Patent Document 2, the main DC/DC converter boosts or steps down the generated power input from the solar cell and outputs it. The first DC/DC converter boosts the power output from the main DC/DC converter to a high voltage battery charge setting voltage. The second DC/DC converter boosts or lowers the power output from the main DC/DC converter to an accessory battery charge setting voltage suitable for charging the accessory battery.

By the way, in the technology described in Patent Document 2, an auxiliary battery for storing power supplied to a low voltage load and a high voltage battery for storing power supplied to a traveling drive motor are separately provided, and the stored power is not supplied to the drive motor. Therefore, in the technique described in Patent Document 2, it is necessary to sufficiently increase the capacity of the high voltage battery, and the high voltage battery is enlarged.

In view of the problems described above, the present invention provides a power supply device capable of miniaturizing a power storage device.

SUMMARY (1) A power supply device according to an aspect of the present invention includes: a first power storage device capable of supplying power to a first load; a second power storage device configured to output a voltage higher than an output voltage of the first power storage device and is connected in series to the first power storage device; a voltage converter connected to an output terminal of the first power storage device and configured to output a converted voltage obtained by voltage converting the output voltage of the first power storage device; a second load connected to an output terminal of the voltage converter and to which the converted voltage is applied; and a control unit configured to control the voltage converter at a fixed boost ratio such that the converted voltage is a sum of the output voltage of the first power storage device and an output voltage of the second power storage device, wherein the output terminal of the first power storage device is connected to the second power storage device, and an output terminal of the second power storage device is connected to the output terminal of the voltage converter.

(2) In the power supply device described in (1), even when remaining capacities of the first power storage device and the second power storage device change, the control unit may maintain a ratio of the output voltage of the first power storage device to the output voltage of the second power storage device constant.

(3) In the power supply device according to (2), the output voltage of the first power storage device may be controlled to be a voltage in a range in which the first load can operate, and the sum of the output voltage of the first power storage device and the output voltage of the second power storage device may be controlled to be a voltage in a range in which the second load can operate.

(4) In the power supply device according to any one of (1) to (3), the voltage converter may include a plurality of conversion circuits, each of the plurality of conversion circuits may be controlled by the boost ratio fixed by the control unit, and a product of the boost ratio of each of the plurality of conversion circuits and the output voltage of the first power storage device may be equal to the sum of the output voltage of the first power storage device and the output voltage of the second power storage device.

(5) In the power supply device according to (4), the plurality of conversion circuits may include a first conversion circuit and a second conversion circuit, the first conversion circuit may include: a first upper arm connected to an intermediate potential line; a first lower arm connected to a common potential line; a first reactor connected between a first connection point, which is a connection point between the first upper arm and the first lower arm, and the output terminal of the first power storage device; a second upper arm connected to the intermediate potential line; a second lower arm connected to the common potential line; and a second reactor connected between a second connection point, which is a connection point between the second upper arm and the second lower arm, and the output terminal of the first power storage device, and is magnetically coupled to the first reactor, the first conversion circuit may convert the output voltage of the first power storage device into a voltage of the intermediate potential line according to the fixed boost ratio, the second conversion circuit may include: a third upper arm connected to the output terminal of the voltage converter; a third lower arm connected to the common potential line; a third reactor connected between a third connection point, which is a connection point between the third upper arm and the third lower arm, and the intermediate potential line; a fourth upper arm connected to the output terminal of the voltage converter; a fourth lower arm connected to the common potential line; and a fourth reactor connected between a fourth connection point, which is a connection point of the fourth upper arm and the fourth lower arm, and the intermediate potential line, and magnetically coupled to the third reactor, the second conversion circuit may convert the voltage of the intermediate potential line to the output voltage of the voltage converter by the fixed boost ratio, and a product of the boost ratio of the first conversion circuit, the boost ratio of the second conversion circuit, and the output voltage of the first storage device may be equal to the sum of the output voltage of the first storage device and the output voltage of the second storage device.

(6) In the power supply device described in (5), the boost ratio of the first conversion circuit may be fixed at two times, the boost ratio of the second conversion circuit may be fixed at two times, and the output voltage of the second power storage device may be three times the output voltage of the first power storage device.

The power supply device according to (1) includes the first power storage device capable of supplying power to the first load. Further, the converted voltage output from the voltage converter and applied to the second load is obtained by converting the output voltage of the first power storage device, and becomes the sum of the output voltage of the first power storage device and the output of the second power storage device.

That is, in the power supply device described in (1), the power stored in the first power storage device can be supplied to the first load (that is, the first load can be driven), and can also be supplied to the second load (that is, the second load can also be driven).

Therefore, in the power supply device according to (1), the first power storage device capable of supplying power to the first load and the second power storage device capable of supplying power to the second load are separately provided. The second storage device provided (mounted) on the power supply device can be miniaturized as compared with the case where the power stored in the first power storage device is not supplied to the second load when the voltage converter is not boosted.

In the power supply device described in (2), even when the remaining capacities of the first power storage device and the second power storage device change, the ratio between the output voltage of the first power storage device and the output voltage of the second power storage device may be kept constant.

In such a configuration, it is possible to maintain the ratio between the output voltage of the first power storage device and the output voltage of the second power storage device constant by controlling the voltage converter with a fixed boost rate.

In the power supply device according to (3), the sum of the output voltage of the first power storage device and the output voltage of the second power storage device may be controlled to be a voltage in a range in which the second load can operate.

In such a configuration, the entire power supply device can be miniaturized as compared with the case where the second load is operated only by the second power storage device.

In the power supply device according to the above (4), each of the plurality of conversion circuits provided in the voltage converter is controlled by the fixed boost ratio, and the product of the boost ratios of each of the plurality of conversion circuits and the output voltage of the first power storage device may be equal to the sum of the output voltage of the first power storage device and the output voltage of the second power storage device.

In such a configuration, the product of "the boost ratios of each of the plurality of conversion circuits" which are multiplied by the number of "the plurality of conversion circuits" and "the output voltage of the first power storage device" becomes equal to "the sum of the output voltage of the first power storage device and the output voltage of the second power storage device".

Since the boost ratio of the whole voltage converter can be changed depending on how each boost ratio of a plurality of conversion circuits is set, the degree of freedom of the combination of the sum of the output voltage of the first power storage device and the output voltage of the second power storage device can be improved.

In the power supply device according to (5), the plurality of conversion circuits may include a first conversion circuit and a second conversion circuit. The first conversion circuit includes a first reactor connected between the intermediate potential line and the output terminal of the first power storage device, and a second reactor connected between the intermediate potential line and the output terminal of the first power storage device and magnetically coupled to the first reactor. The second conversion circuit includes a third reactor connected between the output terminal of the voltage converter and the intermediate potential line, and a fourth reactor connected between the output terminal of the voltage converter and the intermediate potential line and magnetically coupled to the third reactor.

In such a configuration, the DC component of the magnetic flux is canceled and reduced by performing the energization for the first reactor and the energization for the second reactor in opposite phases, and the change in self-induced magnetic flux and the change in mutually induced magnetic flux strengthen each other. Thereby, it is possible to limit an increase in coil current for creating a change in magnetic flux that generates a voltage. Also, the DC component of the magnetic flux is canceled and reduced by performing the energization for the third reactor and the energization for the fourth reactor in opposite phases, and the change in self-induced magnetic flux and the change in mutually induced magnetic flux strengthen each other. Thereby, it is possible to limit an increase in coil current for creating a change in magnetic flux that generates a voltage.

That is, since the increase in the self-inductance required for the reactor can be limited, the reactor can be miniaturized or the cost of the reactor can be reduced.

In the power supply device described in (6), the boost ratio of the first conversion circuit may be fixed at two times, the boost ratio of the second conversion circuit may be fixed at two times, and the output voltage of the second power storage device may be three times the output voltage of the power storage device.

In such a configuration, it is not necessary to provide a power storage device having an output voltage that is four times the output voltage of the first power storage device, and it is possible to operate the second load that can be operated with a voltage that is four times the output voltage of the first power storage device.

DETAILED DESCRIPTION OF THE PREFERRED EMBODIMENTS

Before describing the embodiment of the power supply device of the present invention, a general power supply device will be described.

Figure 1:
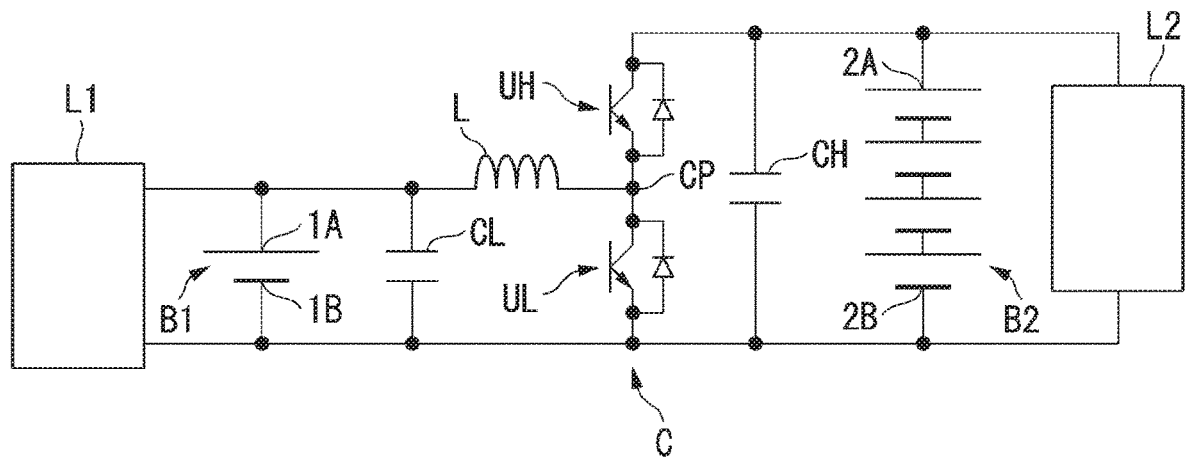
FIG. 1 is a diagram showing an example of a general power supply device.

FIG. 1 is a diagram showing an example of a general power supply device. In the example shown in FIG. 1, the power supply device includes a first power storage device B1 (12 V battery), a second power storage device B2 (48 V battery), and a voltage converter (DC-DC converter). The first power storage device B1 can supply power to the first load L1 (12 V load). The second power storage device B2 can supply power to the second load L2 (48 V load). The voltage converter outputs a converted voltage obtained by voltage-converting (boosting) the output voltage of the first power storage device B1, or outputs a converted voltage obtained by voltage-converting (step-down) the output voltage of the second power storage device B2. The voltage converter includes an upper arm UH, a lower arm UL, a reactor L, a capacitor CL, and a capacitor CH. The upper arm UH includes a switching element and a free wheeling diode connected in antiparallel to the switching element. The lower arm UL includes a switching element and a free wheeling diode connected in antiparallel to the switching element.

In the example shown in FIG. 1, one end of the first load L1 is connected to the high potential side terminal (output terminal) 1A of the first power storage device B1. The other end of the first load L1 is connected to the low potential side terminal 1B of the first power storage device B1. One end of the second load L2 is connected to the high potential side terminal 2A of the second power storage device B2. The other end of the second load L2 is connected to the low potential side terminal 2B of the second power storage device B2.

One end of the first load L1 is connected to one end of the capacitor CL. The other end of the first load L1 is connected to the other end of the capacitor CL.

One end of the second load L2 is connected to one end of the capacitor CH. The other end of the second load L2 is connected to the other end of the capacitor CH. Further, one end of the second load L2 is connected to one end of the upper arm UH. The other end of the upper arm UH is connected to one end of the lower arm UL via a connection point CP. The connection point CP is connected to the high potential side terminal 1A of the first power storage device B1 via the reactor L. The other end of the lower arm UL is connected to the other end of the second load L2 and the low potential side terminal 1B of the first power storage device B1.

In the example shown in FIG. 1, the 12V power supply system includes the first power storage device B1, and the 48V power supply system includes the second power storage device B2. The 12 V power supply system and the 48 V power supply system are connected via a voltage converter (bidirectional DC-DC converter). Power is exchanged between the 12V power system and the 48V power system. The voltage converter is configured by a step-up (step-down) chopper.

In the example shown in FIG. 1, the first power storage device B1 for storing the power supplied to the first load L1 and the second power storage device B2 for storing the power supplied to the second load L2 are separately provided. The power stored in power storage device B1 is not supplied to second load L2 except during boosting (that is, when the voltage converter is not boosting). Therefore, in the example shown in FIG. 1, the capacity of the second power storage device B2 needs to be sufficiently large (that is, the second power storage device B2 needs to be a 48 V battery matched to the second load L2 (48 V load)), and the second power storage device B2 becomes larger. As a result, the overall size of the power supply device is increased, and the weight of the entire power supply device is increased.

Hereinafter, an embodiment of a power supply device of the present invention will be described with reference to the attached drawings.

First Embodiment

Figure 2:
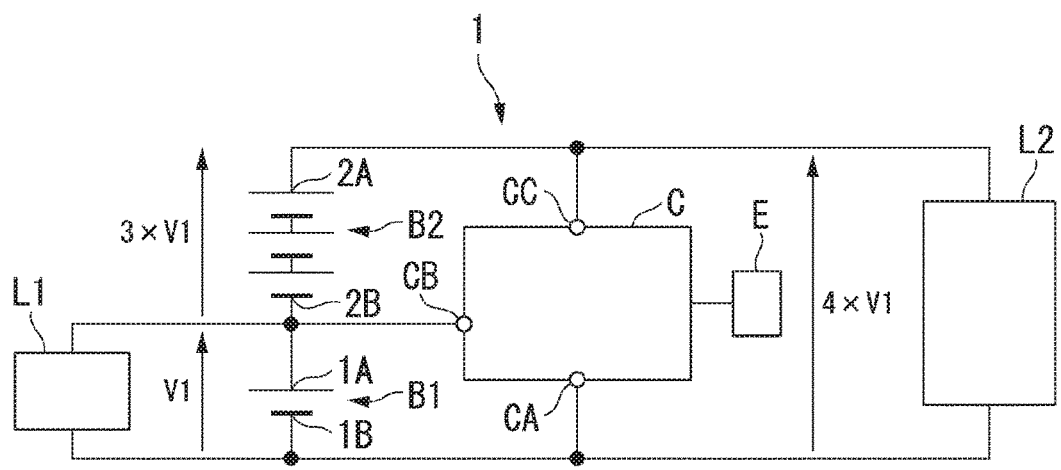
FIG. 2 is a diagram showing an example of a power supply device according to the first embodiment.

FIG. 2 is a diagram showing an example of the power supply device 1 according to the first embodiment.

In the example shown in FIG. 2, a first power storage device B1 (12 V battery), a second power storage device B2 (36 V battery), a voltage converter C (DC-DC converter, step-up chopper), a second load L2 (48 V load), and a control unit E are provided.

The first power storage device B1 can supply power to the first load L1 (12 V load). The second power storage device B2 outputs a voltage higher than the output voltage of the first power storage device B1, and is connected in series to the first power storage device B1. In detail, the high potential side terminal (output terminal) 1A of the first power storage device B1 is connected to the low potential side terminal 2B of the second power storage device B2. The first power storage device B1 and the second power storage device B2 connected in series can supply power to the second load L2 (48 V load).

The voltage converter C outputs a converted voltage obtained by voltage converting (boosting) the output voltage of the first power storage device B1. The voltage-converted (boosted) converted voltage is applied to the second load L2. The voltage converter C includes a terminal CA, a terminal CB, and a terminal (output terminal) CC.

The control unit E controls the voltage converter C by a fixed boost ratio (four times, in the example shown in FIG.

1) so that the converted voltage output by the voltage converter C is the sum of the output voltage of first power storage device B1 and the output voltage of second power storage device B2.

In the example shown in FIG. 2, the first power storage device B1 is a 12 V battery, the second power storage device B2 is a 36 V battery, the first load L1 is a load that can be operated by a 12 V power supply, and the second load L2 is a load that can be operated by a 48 V power supply. Specifically, in the example shown in FIG. 2, the output voltage of the first power storage device B1 is controlled to be a voltage in a range in which the first load L1 can operate.

In another example, the first power storage device B1 may be a battery that outputs a DC voltage other than 12 V, the second power storage device B2 may be a battery that outputs a DC voltage other than 36 V, the first load L1 may be a load operable by a DC power supply other than 12V, and the second load L2 may be a load operable by a DC power supply other than 48V. Also in this example, the output voltage of the first power storage device B1 is controlled to be a voltage in a range in which the first load L1 can operate.

In the example shown in FIG. 2, one end of the first load L1 is connected to the high potential side terminal (output terminal) 1A of the first power storage device B1. The other end of the first load L1 is connected to the low potential side terminal 1B of the first power storage device B1. One end of the second load L2 is connected to the high potential side terminal 2A of the second power storage device B2. The other end of the second load L2 is connected to the low potential side terminal 1B of the first power storage device B1.

The terminal CA of the voltage converter C is connected to the low potential side terminal 1B of the first power storage device B1 and the other end of the second load L2. The terminal CB of the voltage converter C is connected to the high potential side terminal (output terminal) 1A of the first power storage device B1. The terminal (output terminal) CC of the voltage converter C is connected to the high potential side terminal (output terminal) 2A of the second power storage device B2 and one end of the second load L2.

That is, in the example shown in FIG. 2, the sum (48 V) of the output voltage (12 V) of the first power storage device B1 and the output voltage (36 V) of the second power storage device B2 is controlled to be a voltage within the range in which the second load L2 (48V load) can operate. Therefore, the second power storage device B2 can be miniaturized compared to the example shown in FIG. 1 in which the second load L2 is operated only by the second power storage device B2.

Figure 3:
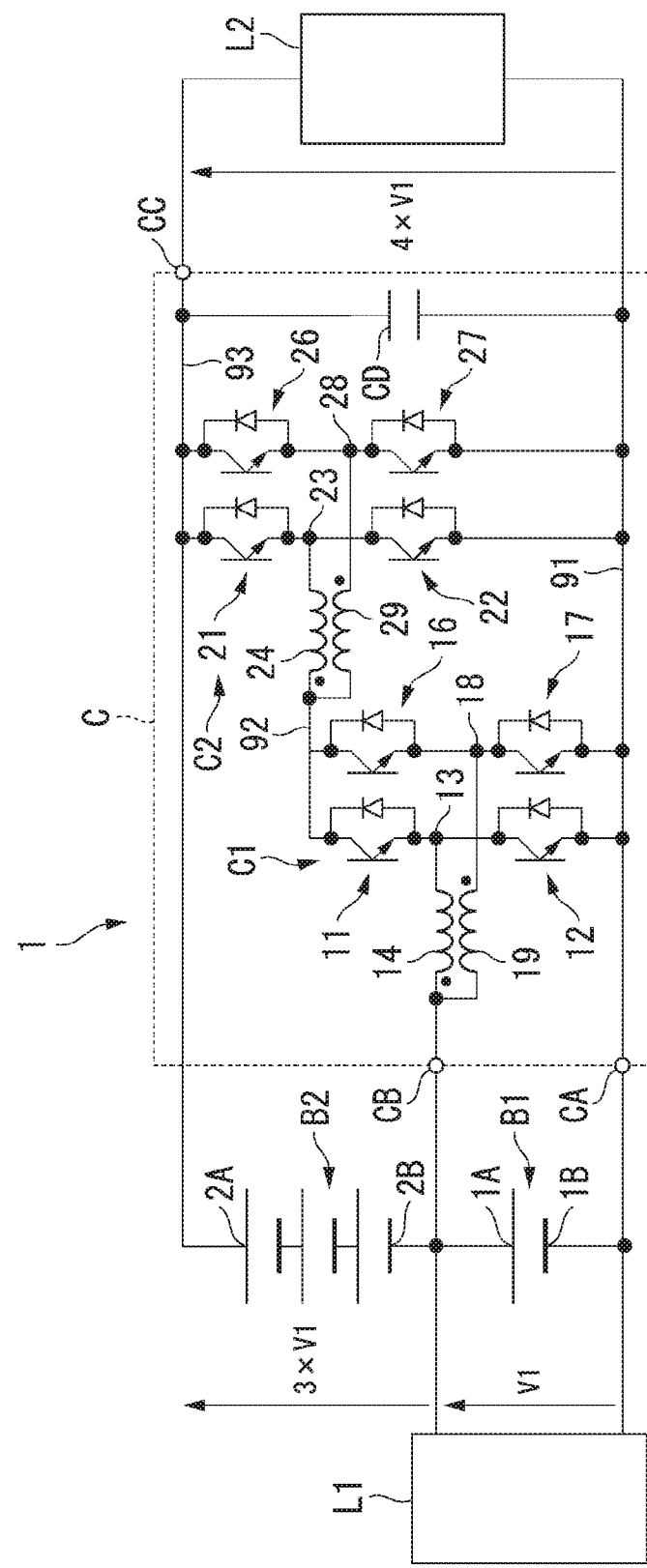
FIG. 3 is a view showing in detail the voltage converter and the like shown in FIG. 2.

FIG. 3 is a diagram showing in detail the voltage converter C shown in FIG. 2.

In the example shown in FIG. 3, the voltage converter C includes a first conversion circuit C1, a second conversion circuit C2, a capacitor CD, a common potential line 91, an intermediate potential line 92, and an output potential line 93.

The first conversion circuit C1 converts the voltage of the output voltage of the first power storage device B1 input between the terminal CA and the terminal CB of the voltage converter C (in the example shown in FIG. 3, boosts the voltage by two times). In detail, the first conversion circuit C1 is controlled by a fixed boost rate (two times). The second conversion circuit C2 further converts the voltage boosted and output by the first conversion circuit C1 (in the example shown in FIG. 3, boosts the voltage by two times). The second conversion circuit C2 is also controlled by the fixed boost ratio (two times). As a result, the output voltage of the first power storage device B1 input between the terminal CA and the terminal CB of the voltage converter C is quadrupled (boosted by 2×2 times) by the first conversion circuit C1 and the second conversion circuit C2.

The capacitor CD is boosted by the first conversion circuit C1, and is smoothed by the second conversion circuit C2 to be boosted and output. The common potential line 91 is connected to the terminal CA of the voltage converter C. The intermediate potential line 92 connects the first conversion circuit C1 and the second conversion circuit C2. The output potential line 93 is connected to the terminal (output terminal) CC of the voltage converter C.

In the example shown in FIG. 3, the first conversion circuit C1 includes the first upper arm 11, the first lower arm 12, the first connection point 13, the first reactor 14, the second upper arm 16, a second lower arm 17, a second connection point 18, and a second reactor 19.

The first upper arm 11 includes a switching element controlled by the control unit E (see FIG. 2) and a free wheeling diode connected in antiparallel to the switching element. The switching element is, for example, an IGBT (Insulated Gate Bipolar Transistor), a MOSFET (Metal Oxide Semi-Conductor Field Effect Transistor), or the like. The first lower arm 12, the second upper arm 16, and the second lower arm 17 are configured in the same manner as the first upper arm 11.

One end of the first upper arm 11 is connected to the intermediate potential line 92. The other end of the first upper arm 11 is connected to one end of the first lower arm 12 via a first connection point 13. That is, the first connection point 13 is a connection point between the other end of the first upper arm 11 and one end of the first lower arm 12. The other end of the first lower arm 12 is connected to the common potential line 91. The first connection point 13 is connected to the terminal CB of the voltage converter C via the first reactor 14. That is, the first reactor 14 is connected between the first connection point 13 and the high potential side terminal (output terminal) 1A of the first power storage device B1.

One end of the second upper arm 16 is connected to the intermediate potential line 92. The other end of the second upper arm 16 is connected to one end of the second lower arm 17 via the second connection point 18. That is, the second connection point 18 is a connection point between the other end of the second upper arm 16 and one end of the second lower arm 17. The other end of the second lower arm 17 is connected to the common potential line 91. The second connection point 18 is connected to the terminal CB of the voltage converter C via the second reactor 19. That is, the second reactor 19 is connected between the second connection point 18 and the high potential side terminal (output terminal) 1A of the first power storage device B1.

The first reactor 14 and the second reactor 19 are magnetically coupled. In detail, the first reactor 14 and the second reactor 19 constitute a close coupled reactor. The close coupling is a coupling in which the leakage of the magnetic flux acting between the first reactor 14 and the second reactor 19 is small, and corresponds to the case where the coupling coefficient k≈1, or, alternatively may be set as k≥0.95, for example.

The first conversion circuit C1 converts the output voltage (12 V, in the example shown in FIG. 3) of the first power storage device B1 into the voltage (24V, in the example shown in FIG. 3) of the intermediate potential line 92 by a fixed boost ratio (two times, in the example shown in FIG. 3).

In the example shown in FIG. 3, the second conversion circuit C2 includes a third upper arm 21, a third lower arm 22, a third connection point 23, a third reactor 24, a fourth upper arm 26, a fourth lower arm 27, a fourth connection point 28, and a fourth reactor 29.

The third upper arm 21, the third lower arm 22, the fourth upper arm 26, and the fourth lower arm 27 are configured similarly to the first upper arm 11.

One end of the third upper arm 21 is connected to the output potential line 93. That is, one end of the third upper arm 21 is connected to the terminal (output terminal) CC of the voltage converter C. The other end of the third upper arm 21 is connected to one end of the third lower arm 22 via a third connection point 23. That is, the third connection point 23 is a connection point between the other end of the third upper arm 21 and one end of the third lower arm 22. The other end of the third lower arm 22 is connected to the common potential line 91. The third connection point 23 is connected to the intermediate potential line 92 via the third reactor 24. That is, the third reactor 24 is connected between the third connection point 23 and the intermediate potential line 92.

One end of the fourth upper arm 26 is connected to the output potential line 93. That is, one end of the third upper arm 21 is connected to the terminal (output terminal) CC of the voltage converter C. The other end of the fourth upper arm 26 is connected to one end of the fourth lower arm 27 via a fourth connection point 28. That is, the fourth connection point 28 is a connection point between the other end of the fourth upper arm 26 and one end of the fourth lower arm 27. The other end of the fourth lower arm 27 is connected to the common potential line 91. The fourth connection point 28 is connected to the intermediate potential line 92 via the fourth reactor 29. That is, the fourth reactor 29 is connected between the fourth connection point 28 and the intermediate potential line 92.

The third reactor 24 and the fourth reactor 29 are magnetically coupled. In detail, the third reactor 24 and the fourth reactor 29 constitute a close coupled reactor. The second conversion circuit C2 converts the voltage (24 V, in the example shown in FIG. 3) of the intermediate potential line 92 (the output voltage of the first conversion circuit C1) into the output voltage (48 V, in the example shown in FIG. 3) of the voltage converter C (the voltage of the output potential line 93) by a fixed boost ratio (two times, in the example shown in FIG. 3)

In the example shown in FIG. 3, the product (2×2×12 V=48 V) of the boost ratio (two times) of the first conversion circuit C1, the boost ratio (two times) of the second conversion circuit C2, and the output voltage V1 (12 V) of the first power storage device B1 is equal to the sum (4×V1) (12 V+36 V=48 V) of the output voltage V1 (12 V) of the first power storage device B1 and the output voltage (3×V1) (36 V) of the second power storage device B2.

In detail, in the example shown in FIG. 3, the boost ratio of the first conversion circuit C1 is fixed at two times. Further, the boost ratio of the second conversion circuit C2 is also fixed at two times. The output voltage (36 V=3×12 V) of the second power storage device B2 is three times the output voltage (12 V) of the first power storage device B1.

Therefore, in the example shown in FIG. 3, it is not necessary to provide a power storage device having an output voltage that is four times the output voltage of the first power storage device B1, and it is possible to operate the second load L2 that can be operated by a voltage that is four times the output voltage of the first power storage device B1.

In other words, in the example shown in FIG. 3, the first power storage device B1 (12 V battery) and the second power storage device B2 (36 V battery), which are connected in series, are connected to the second load L2 (48 V load (48 V system)). The first power storage device B1 (12 V battery) is connected to a first load L1 (12 V load (12 V system)).

The inputs (terminals CA and CB) of the voltage converter C are connected to the first power storage device B1 (12 V battery). The outputs (terminals CA and CC) of the voltage converter C are connected to the second load L2 (48V load).

The voltage converter C has a two-stage configuration of a two-phase magnetic coupling boost chopper. The input of the first stage (first conversion circuit C1) is the input (voltage between the terminal CA and the terminal CB) of the voltage converter C. The output (voltage between the common potential line 91 and the intermediate potential line 92) of the first stage (first conversion circuit C1) is the input of the second stage (second conversion circuit C2). The output of the second stage is the output of the voltage converter C (the voltage between the terminal CA and the terminal CC).

The coupling between the first reactor 14 and the second reactor 19 and the coupling between the third reactor 24 and the fourth reactor 29 are close couplings in which the degree of coupling of the magnetic coupling reactors is high.

The boost rate of each of the two boost choppers (the first conversion circuit C1 and the second conversion circuit C2) is fixed at two times. Due to the fixed boosting, the ratio of the output voltage of the first power storage device B1 (12 V battery) to the output voltage of the second power storage device B2 (36 V battery) is always constant (1:3).

Figure 4A:
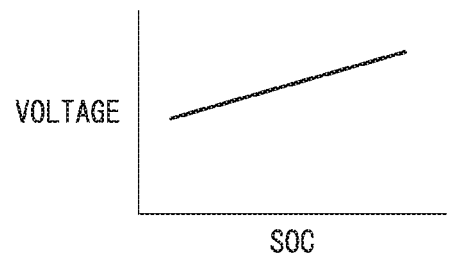
FIGS. 4A and 4B are diagrams showing the reason why the ratio between the output voltage of the first power storage device and the output voltage of the second power storage device is always constant due to fixed boosting.

FIG. 4 shows the reason why the ratio of the output voltage of the first power storage device B1 (12 V battery) to the output voltage of the second power storage device B2 (36 V battery) is always constant (1:3) by fixed boosting. Specifically, FIG. 4A shows the relationship between the output voltage of a power storage device such as the first power storage device B1 (12 V battery) or the second power storage device B2 (36 V battery), and the SOC (State of Charge). In FIG. 4A, the vertical axis represents the output voltage of the power storage device, and the horizontal axis represents the SOC of the power storage device. As shown in FIG. 4A, the SOC of the power storage device and the output voltage have a predetermined correlation, for example, as a linear relationship.

Figure 4B:
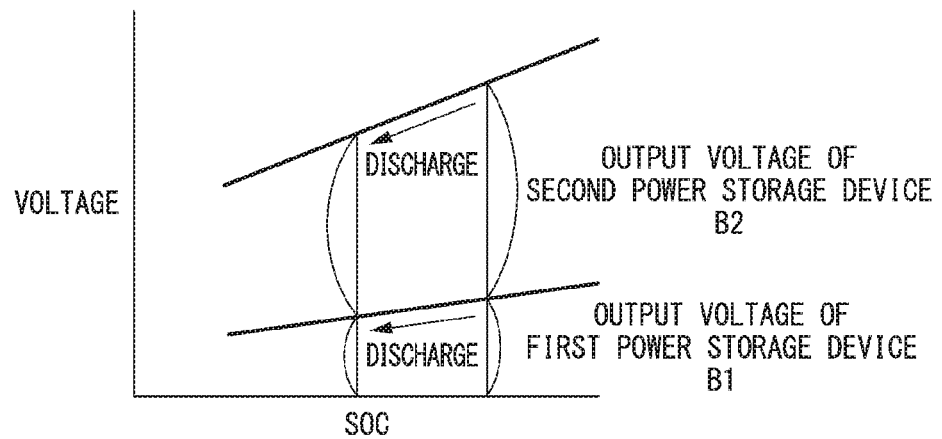

FIG. 4B is a view showing the relationship between the output voltage of the first power storage device B1 and the second power storage device B2, which are connected in series, and the SOC. In FIG. 4B, the vertical axis represents the output voltage of the first power storage device B1 and the second power storage device B2 connected in series, and the horizontal axis represents the SOC of the first power storage device B1 and the second power storage device B2. As shown in FIG. 4B, when the SOC of one of the first power storage device B1 and second power storage device B2 changes due to the discharge of one of the first power storage device B1 and the second power storage device B2, the output voltage of one of the first power storage device B1 and the second power storage device B2 changes. Accordingly, the other of the first power storage device B1 and the second power storage device B2 is discharged so that the ratio of the output voltage of the first power storage device B1 to the output voltage of the second power storage device B2 is constant (1:3), and the output voltage of the other of the first power storage device B1 and the second power storage device B2 also changes. As a result, the relationship that the SOC of the first power storage device B1 equals to the SOC of the second power storage device B2 is maintained.

In other words, in the power supply device 1 according to the first embodiment, as shown in FIG. 4B, even when the remaining capacity (SOC) of each of the first power storage device B1 and the second power storage device B2 changes, the ratio of the output voltage of the first power storage device B1 to the output voltage of the second power storage device B2 is maintained constant.

That is, in the power supply device 1 of the first embodiment, as shown in FIG. 4B, the ratio to the output voltage of the first power storage device B1 and the output voltage of the second power storage device B2 can be maintained constant by controlling the voltage converter C with a fixed boost rate.

Figure 5A:
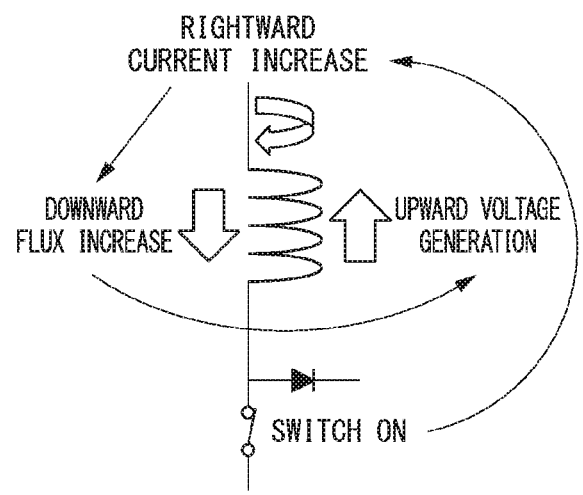
FIGS. 5A and 5B are diagrams showing the principle of electromagnetic induction.
Figure 5B:
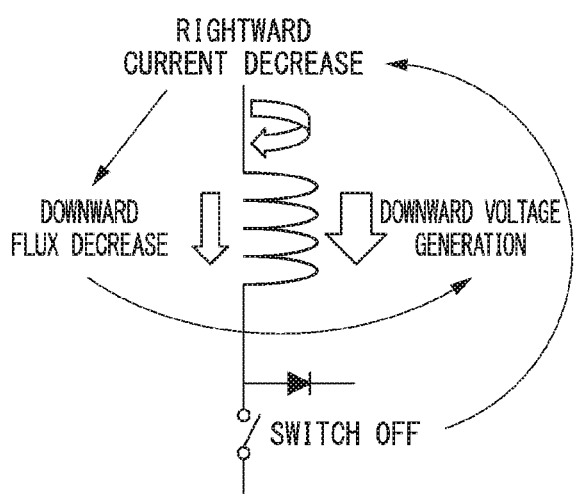

FIGS. 5A and 5B are diagrams showing the principle of electromagnetic induction. Specifically, FIG. 5A shows an example in which the rightward current increases, and FIG. 5B shows an example in which the rightward current decreases.

As shown in FIG. 5A, when the current to the right is increased, the downward magnetic flux is increased. As a result, an upward voltage (a voltage that prevents the increase of the current flowing to the right) is generated.

As shown in FIG. 5B, when the current flowing to the right decreases, the downward flux decreases. As a result, a downward voltage (a voltage that prevents the reduction of the current flowing to the right) is generated.

Specifically, when a current (coil current I) flows in the coil, a flux (coil flux linkage D) linked to the coil is generated. The magnitude of the coil linkage flux D is proportional to the coil current I ($\Phi \propto I$).

At both ends of the coil, a voltage (induction voltage) V ($\propto -\Delta\Phi/\Delta t$) is generated that is proportional to the time change ($\Delta\Phi/\Delta t$) of the coil flux linkage D. $\Delta\Phi$ is a magnetic flux change amount. $\Delta t$ is switch ON (OFF) time.

Figure 6:
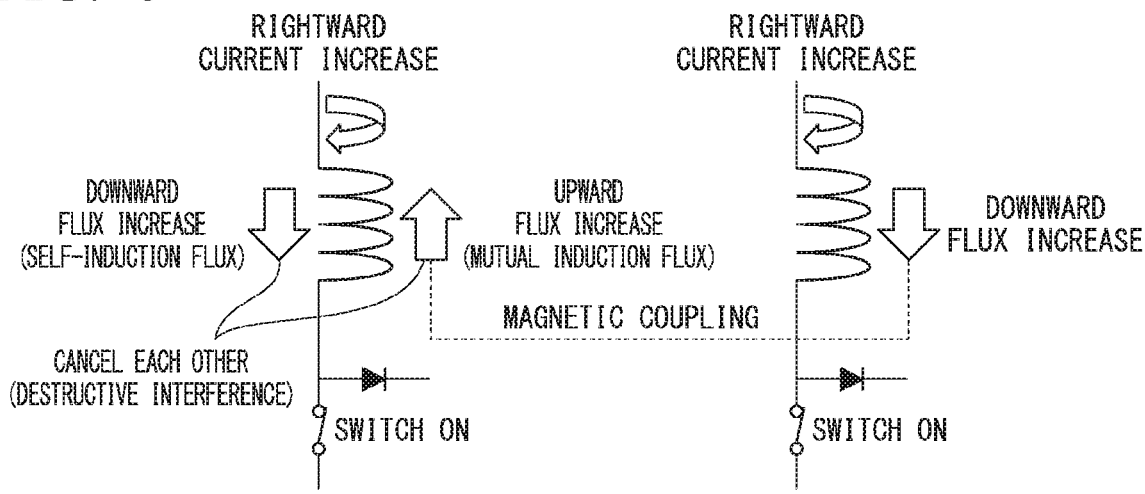
FIG. 6 is a diagram showing electromagnetic induction in an example in which two reactors constitute a close coupling reactor, and an energization timing for one reactor and an energization timing for the other reactor overlap, similar to the power supply device of the first embodiment.

FIG. 6 is a diagram showing the electromagnetic induction in an example in which two reactors form a tightly coupled reactor similar to the power supply device 1 of the first embodiment, and the energization timing for one reactor and the energization timing for the other reactor overlap different from the power supply device 1 of the first embodiment.

In the example shown in FIG. 6, similar to the example shown in FIG. 5A, when the rightward current flowing through the left reactor (coil) in FIG. 6 increases, the downward magnetic flux (self-induced magnetic flux) in the left reactor in FIG. 6 increases.

In the example shown in FIG. 6, the energization timing for the left reactor in FIG. 6 and the energization timing for the right reactor in FIG. 6 overlap, so, similarly to the example shown in FIG. 5A, when the rightward current flowing through the right reactor (coil) in FIG. 6 increases, the downward magnetic flux in the right reactor in FIG. 6 increases.

In the example shown in FIG. 6, the reactor on the left side in FIG. 6 and the reactor on the right side in FIG. 6 are magnetically coupled to form a tightly coupled reactor, so, as the downward magnetic flux of the right reactor in FIG. 6 increases, the upward magnetic flux (mutually induced magnetic flux) increases in the left reactor of FIG. 6.

In other words, in the example shown in FIG. 6, the energization timing for the reactor on the left side of FIG. 6 and the energization timing for the reactor on the right side in FIG. 6 overlap, the change in self-induced magnetic flux and the change in mutually induced magnetic flux cancel each other. As a result, the current (coil current) flowing through the reactor to produce a change in magnetic flux that generates a voltage is greatly increased. That is, the current ripple increases and the equivalent inductance decreases.

Figure 7:
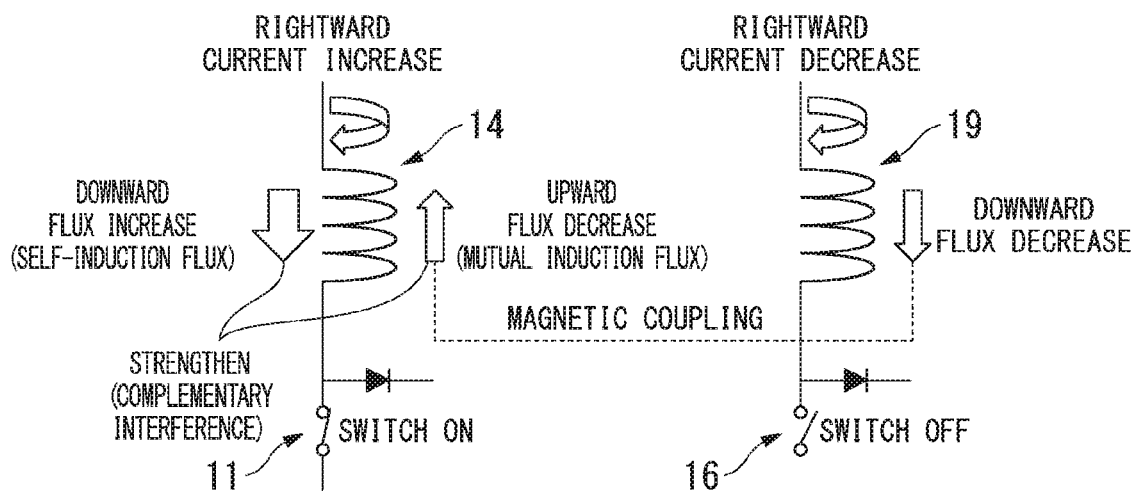
FIG. 7 is a diagram showing energization timings and the like for the first reactor and the second reactor shown in FIG. 3 that constitute a tightly coupled reactor.

FIG. 7 is a diagram showing the energization timing and the like for the first reactor 14 and the second reactor 19 shown in FIG. 3 which constitute the tightly coupled reactor.

In the example shown in FIG. 7, when the rightward current flowing through the first reactor 14 increases as the switching element of the first upper arm 11 is turned ON, the downward magnetic flux (self-induced magnetic flux) of the first reactor 14 increases.

In the example shown in FIG. 7 (power supply device 1 of the first embodiment), the switching element of the second upper arm 16 is turned off at the timing when the switching element of the first upper arm 11 is turned on. As a result, the rightward current flowing through the second reactor 19 decreases, and the downward magnetic flux of the second reactor 19 decreases.

In the example shown in FIG. 7 (the power supply device 1 of the first embodiment), the first reactor 14 and the second reactor 19 are magnetically coupled to form a tightly coupled reactor, so that the second reactor 19 faces downward. In the first reactor 14, the upward magnetic flux (mutually induced magnetic flux) decreases in accordance with the decrease in the magnetic flux.

In other words, in the example shown in FIG. 7 (the power supply device 1 of the first embodiment), the energization timing for the first reactor 14 and the energization timing for the second reactor 19 do not overlap (the timing at which the switching element of the first upper arm 11 is turned on does not overlap with the timing at which the switching element of the second upper arm 16 is turned on), so the change in self-induced magnetic flux and the change in mutually induced magnetic flux are strengthened. As a result, the increase in current (coil current) flowing through the reactor to produce a change in magnetic flux that generates a voltage is small. That is, the current ripple is reduced and the equivalent inductance is increased.

In detail, in the power supply device 1 of the first embodiment, similarly, the energization timing for the third reactor 24 and the energization timing for the fourth reactor 29 do not overlap. That is, the timing at which the switching element of the third upper arm 21 is turned on does not overlap the timing at which the switching element of the fourth upper arm 26 is turned on. Therefore, even in the closely coupled reactor in which the third reactor 24 and the fourth reactor 29 are magnetically coupled, the change in self-induced magnetic flux and the change in mutually induced magnetic flux are intensified. As a result, the increase in current (coil current) flowing through the reactor to produce a change in magnetic flux that generates a voltage is small. That is, the current ripple is reduced and the equivalent inductance is increased.

That is, in the power supply device 1 of the first embodiment, as shown in FIG. 3, the first conversion circuit C1 includes a first reactor 14 connected between the intermediate potential line 92 and the high potential side terminal (output terminal) 1A of the first power storage device B1, and a second reactor 19 connected between the intermediate potential line 92 and the high potential side terminal (output terminal) 1A of the first power storage device B1 and magnetically coupled to the first reactor 14. The second conversion circuit C2 includes a third reactor 24 connected between the terminal (output terminal) CC of the voltage converter C and the intermediate potential line 92, and a fourth reactor 29 connected between the terminal (output terminal) CC of the voltage converter C and the intermediate potential line 92 and magnetically coupled to the third reactor 24.

Therefore, by performing energization for the first reactor 14 and energization for the second reactor 19 in opposite phases, the DC component of the magnetic flux is canceled and reduced, and the change in self-induced magnetic flux and the change in mutually induced magnetic flux are strengthen each other, so it is possible to limit an increase in coil current for producing a change in magnetic flux that generates a voltage. Also, by performing the energization for the third reactor 24 and the energization for the fourth reactor 29 in opposite phases, while reducing the DC component of the magnetic flux, the change in self-induced magnetic flux and the change in mutually induced magnetic flux are strengthen each other, so it is possible to limit an increase in coil current for producing a change in magnetic flux that generates a voltage.

That is, in the power supply device 1 of the first embodiment, an increase in self-inductance required for the first reactor 14, the second reactor 19, the third reactor 24, and the fourth reactor 29 can be limited, so it is possible to reduce the size of the first reactor 14, the second reactor 19, the third reactor 24, and the fourth reactor 29, or it is possible to reduce the cost of the first reactor 14, the second reactor 19, the third reactor 24, and the fourth reactor 29.

Figure 8:
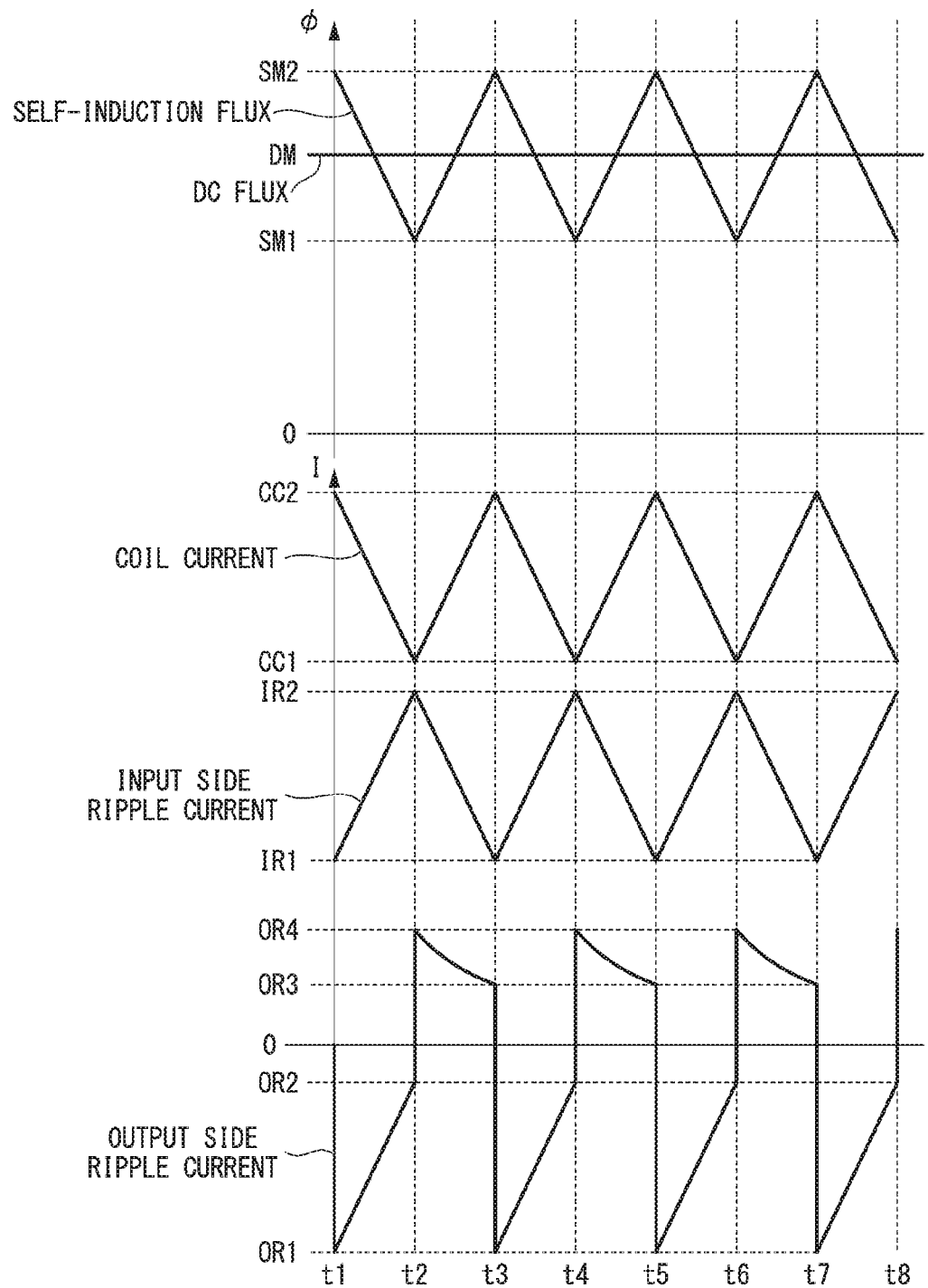
FIG. 8 is a diagram showing self-induced magnetic flux and the like in the case of increasing or decreasing the amount of current supplied to one reactor (nonmagnetic coupling method).

FIG. 8 is a diagram showing self-induced magnetic flux and the like in the case (nonmagnetic coupling system) in which the amount of current (coil current) to one reactor is increased or decreased.

In the example shown in FIG. 8, the switching element for controlling the amount of current supplied to the reactor is turned off during the period t1 to t2, turned on during the period t2 to t3, turned off during the period t3 to t4, turned on during the period t4 to t5, turned off during the period t5 to t6, turned on during the period t6 to t7, and turned off during the period t7 to t8.

Therefore, the amount of current (coil current) supplied to the reactor decreases from the value CC2 to the value CC1 during the period t1 to t2, increases from the value CC1 to the value CC2 during the period t2 to t3, decreases from the value CC2 to the value CC1 during the period t3 to t4, increases from the value CC1 to the value CC2 during the period t4 to t5, decreases from the value CC2 to the value CC1 during the period t5 to t6, increases from the value CC1 to the value CC2 during the period t6 to t7, and decreases from the value CC2 to the value CC1 during the period t7 to t8.

The DC magnetic flux generated in the reactor takes a constant value DM during the period t1 to t8.

The self-induced magnetic flux generated in the reactor decreases from the value SM2 to the value SM1 during the period t1 to t2, increases from the value SM1 to the value SM2 during the period t2 to t3, decreases from the value SM2 to the value SM1 during the period t3 to t4, increases from the value SM1 to the value SM2 during the period t4 to t5, decreases from the value SM2 to the value SM1 during the period t5 to t6, increases from the value SM1 to the value SM2 during the period t6 to t7, and decrease from the value SM2 to the value SM1 during the period t7 to t8.

The input side ripple current increases from the value IR1 to the value IR2 during the period t1 to t2, decreases from the value IR2 to the value IR1 during the period t2 to t3, increases from the value IR1 to the value IR2 during the period t3 to t4, decreases from the value IR2 to the value IR1 during the period t4 to t5, increases from the value IR1 to the value IR2 during the period t5 to t6, decreases from the value IR2 to the value IR1 during the period t6 to t7, and increases from the value IR1 to the value IR2 during the period t7 to t8.

The output side ripple current increases from the value OR1 to the value OR2 during the period t1 to t2, increases stepwise from the value OR2 to the value OR4 at the time t2, decreases from the value OR4 to the value OR3 during the period t2 to t3, decreases stepwise from the value OR3 to the value OR1 at the time t3, increases from the value OR1 to the value OR2 during the period t3 to t4, increased stepwise from the value OR2 to the value OR4 at the time t4, decreases from the value OR4 to the value OR3 during the period t4 to t5, decreases stepwise from the value OR3 to the value OR1 at the time t5, increases from the value OR1 to the value OR2 during the period t5 to t6, increases stepwise from the value OR2 to the value OR4 at the time t6, decreases from the value OR4 to the value OR3 during the period t6 to t7, decreases stepwise from the value OR3 to the value OR1 at the time t7, and increases from the value OR1 to the value OR2 during the period t7 to t8.

In the example shown in FIG. 8, since the magnetic flux that generates a voltage is only self-induction, the coil current ripple is two times than in the case of forming the tightly coupled reactor (the example shown in FIG. 9).

Figure 9A:
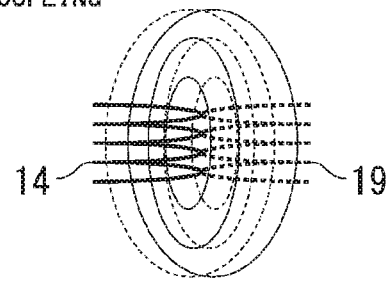
FIGS. 9A and 9B are diagrams showing a tightly coupled reactor and a loosely coupled reactor configured by two reactors.
Figure 9B:
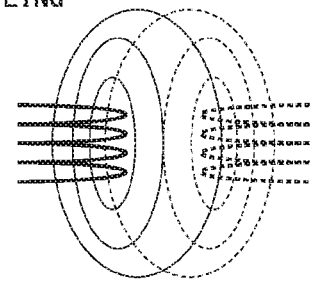

FIGS. 9A and 9B are diagrams showing a tightly coupled reactor configured by two reactors and a loosely coupled reactor. Specifically, FIG. 9A shows a tightly coupled reactor, and FIG. 9B shows a loosely coupled reactor.

In the power supply device 1 of the first embodiment, as shown in FIG. 9A, the first reactor 14 and the second reactor 19 constitute a tightly coupled reactor. Further, the close coupling reactor is also configured by the third reactor 24 (see FIG. 3) and the fourth reactor 29 (see FIG. 3).

In tight coupling, most of the magnetic flux generated by the current flowing through one coil (first reactor 14) is linked to the other coil (second reactor 19). Further, most of the magnetic flux generated by the current flowing through the other coil (the second reactor 19) is linked to the one coil (the first reactor 14).

On the other hand, as shown in FIG. 9B, in the loose coupling, only a part of the magnetic flux generated by the current flowing through one coil (the reactor on the left side of FIG. 9B) interlinks with the other coil (the reactor on the right side of FIG. 9B). Further, only a part of the magnetic flux generated by the current flowing through the other coil (the reactor on the right in FIG. 9B) interlinks with one coil (the reactor on the left in FIG. 9B).

The loose coupling is a coupling with a large loss of magnetic flux, and corresponds to the case where the coupling coefficient k<<1.

Figure 10:
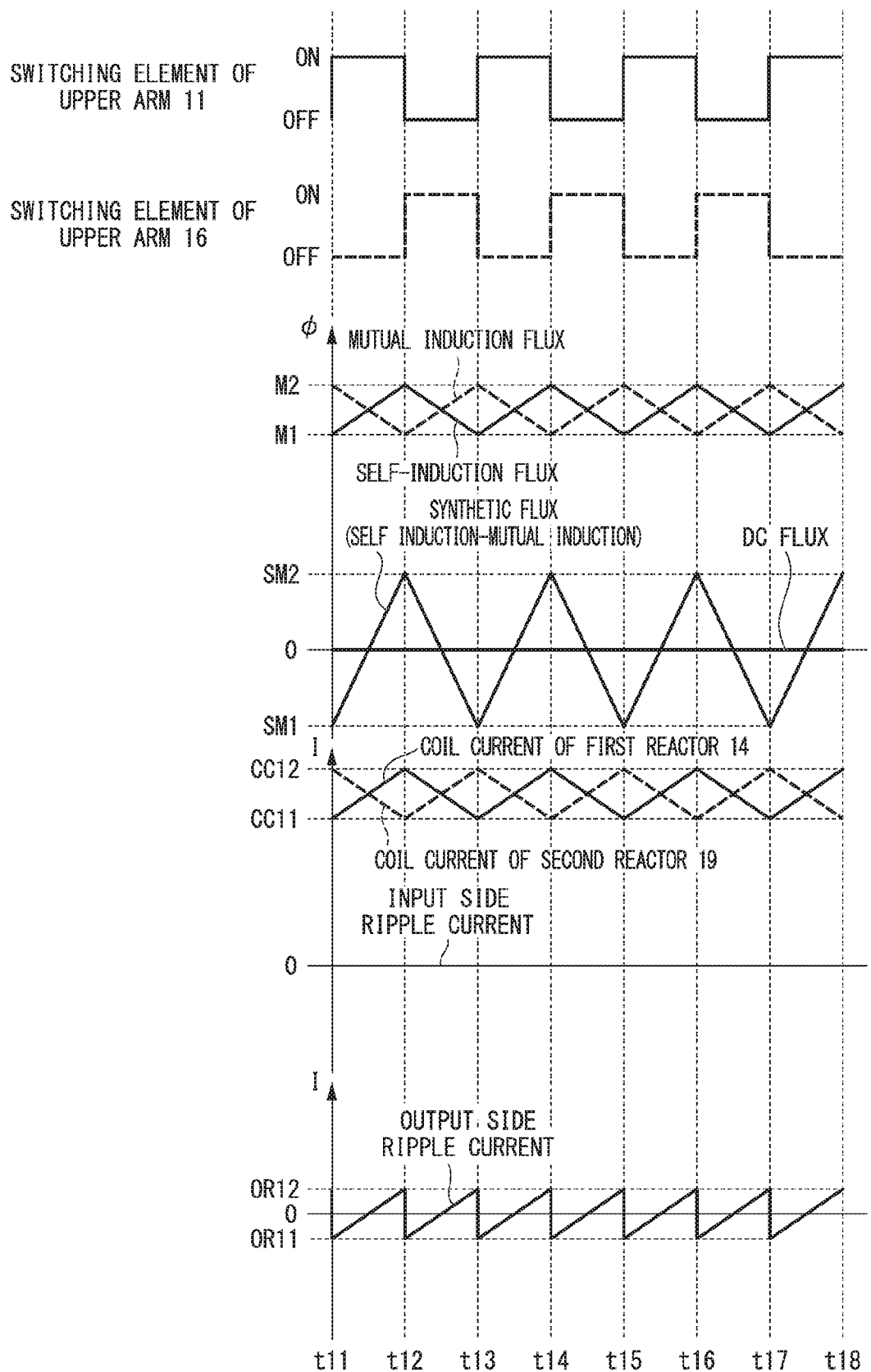
FIG. 10 is a diagram showing self-induced magnetic flux and the like in the case of increasing or decreasing the amount of energization (coil current) to the reactor of the power supply device of the first embodiment.

FIG. 10 is a diagram showing self-induced magnetic flux and the like in the case of increasing or decreasing the amount of current (coil current) to the reactor of the power supply device 1 of the first embodiment. In detail, FIG. 10 is a diagram showing self-induced magnetic flux and the like in the case (magnetic coupling system of tight coupling) of increasing or decreasing the amount of current (coil current) to the first reactor 14 and the second reactor 19 constituting the close coupling reactor.

In the power supply device 1 of the first embodiment (example shown in FIG. 10), in order to realize a duty ratio of 50% (=two times of boost ratio) in the first conversion circuit C1, the phase of the ON period of the switching element of the first upper arm 11 is set to 0° to 180°, and the phase of the ON period of the switching element of the second upper arm 16 is set to 180° to 360°. The phase difference between the ON period of the switching element of the first upper arm 11 and the ON period of the switching element of the second upper arm 16 is set to 180°.

Specifically, the switching element of the first upper arm 11 that controls the amount of current supplied to the first reactor 14 is, by the control unit E (see FIG. 2), turned on during the period t11 to t12 (phase 0° to 180°), turned off during the period t12 to t13 (phase 180° to 360°), turned on during the period t13 to t14, turned off during the period t14 to t15, turned on during the period t15 to t16, turned off during the period t16 to t17, and turned on during the period t17 to t18.

Further, the switching element of the second upper arm 16 that controls the amount of current supplied to the second reactor 19 is, by the control unit E, turned off during the period t11 to t12 (phase 0° to 180°), turned on during the period t12 to t13 (phase 180° to 360°), turned off during the period t13 to t14, turned on during the period t14 to t15, turned off during the period t15 to t16, turned on during the period t16 to t17, and turned off during the period t17 to t18.

That is, in the power supply device 1 of the first embodiment (example shown in FIG. 10), there is no timing when the ON period of the switching element of the first upper arm 11 overlaps the ON period of the switching element of the second upper arm 16, and there is no timing when the OFF period of the switching element of the first upper arm 11 overlaps the OFF period of the switching element of the second upper arm 16. As a result, the self-induction and mutual induction of the first reactor 14 and the second reactor 19 become completely complementary interference.

Specifically, as shown in FIG. 10, the self-induced magnetic flux increases from the value M1 to the value M2 during the period t11 to t12, decreases from the value M2 to the value M1 during the period t12 to t13, increases from the value M1 to the value M2 during the period t13 to t14, decreases from the value M2 to the value M1 during the period t14 to t15, increases from the value M1 to the value M2 during the period t15 to t16, decreases from the value M2 to the value M1 during the period t16 to t17, and increases from the value M1 to the value M2 during the period t17 to t18.

The mutually induced magnetic flux decreases from the value M2 to the value M1 during the period t11 to t12, increases from the value M1 to the value M2 during the period t12 to t13, decreases from the value M2 to the value M1 during the period t13 to t14, increases from the value M1 to the value M2 during the period t14 to t15, decreases from the value M2 to the value M1 during the period t15 to t16, increases from the value M1 to the value M2 during the period t16 to t17, and decreases from the value M2 to the value M1 during the period t17 to t18.

As a result, the resultant magnetic flux (=self-induced magnetic flux−mutually induced magnetic flux) changes from the value SM1 to the value SM2 during the period t11 to t12, changes from the value SM2 to the value SM1 during the period t12 to t13, changes from the value SM1 to the value SM2 during the period t13 to t14, changes from the value SM2 to the value SM1 during the period t14 to t15, changes from the value SM1 to the value SM2 during the period t15 to t16, changes from the value SM2 to the value SM1 during the period t16 to t17, and changes from the value SM1 to the value SM2 during the period t17 to t18.

On the other hand, the DC magnetic flux generated in the first reactor 14 and the second reactor 19 has a value of zero (no DC magnetic flux) during the period t11 to t18.

In the power supply device 1 of the first embodiment (example shown in FIG. 10), the amount of current (coil current) supplied to the first reactor 14 increases from the value CC11 to the value CC12 during the period t11 to t12, decreases from the value CC12 to the value CC11 during the period t12 to t13, increases from the value CC11 to the value CC12 during the period t13 to t14, decreases from the value CC12 to the value CC11 during the period t14 to t15, increases from the value CC11 to the value CC12 during the period t15 to t16, decreases from the value CC12 to the value CC1 during the period t16 to t17, and increases from the value CC11 to the value CC12 during the period t17 to t18.

The energization amount (coil current) for the second reactor 19 decreases from the value CC12 to the value CC11 during the period t11 to t12, increases from the value CC11 to the value CC12 during the period t12 to t13, decreases from the value CC12 to the value CC11 during the period t13 to t14, increases from the value CC11 to the value CC12 during the period t14 to t15, decreases from the value CC12 to the value CC11 during the period t15 to t16, increases from the value CC11 to the value CC12 during the period t16 to t17, and decreases from the value CC12 to the value CC11 during the period t17 to t18.

The difference between the amount of energization (coil current) for the first reactor 14 and the amount of energization (coil current) for the second reactor 19 is smaller than in the case of the loose coupling described later (shown in FIG. 11).

In the power supply device 1 of the first embodiment (an example shown in FIG. 10), the input-side ripple current (the difference between the coil current on the input side of the first reactor 14 and the coil current on the input side of the second reactor 19) has a value of zero (no difference) during the period t11 to t18.

The output side ripple current increases from the value OR11 to the value OR12 during the period t11 to t12, decreases stepwise from the value OR12 to the value OR11 at the time t12, increases from the value OR11 to the value OR12 during the period t12 to t13, decreases stepwise from the value OR12 to the value OR11 at the time t13, increases from the value OR11 to the value OR12 during the period t13 to t14, decreases stepwise from the value OR12 to the value OR11 at the time t14, increases from the value OR11 to the value OR12 during the period t14 to t15, decreases stepwise from the value OR12 to the value OR11 at the time t15, increases from the value OR11 to the value OR12 during the period t15 to t16, decreases stepwise from the value OR12 to the value OR11 at the time t16, increases from the value OR11 to the value OR12 during the period t16 to t17, decreases stepwise from the value OR12 to the value OR11 at the time t17, and increases from the value OR11 to the value OR12 during the period t17 to t18.

The output side ripple current is smaller (specifically, the minimum) than in the case of the loose coupling described later (shown in FIG. 11).

In the power supply device 1 of the first embodiment (example shown in FIG. 10) (magnetic coupling system of close coupling), since the magnetic flux for generating voltage is complementarily synthesized by self-induction and mutual induction, the coil current ripple becomes ½ than in the non-bonded case (example shown in FIG. 8).

Figure 11:
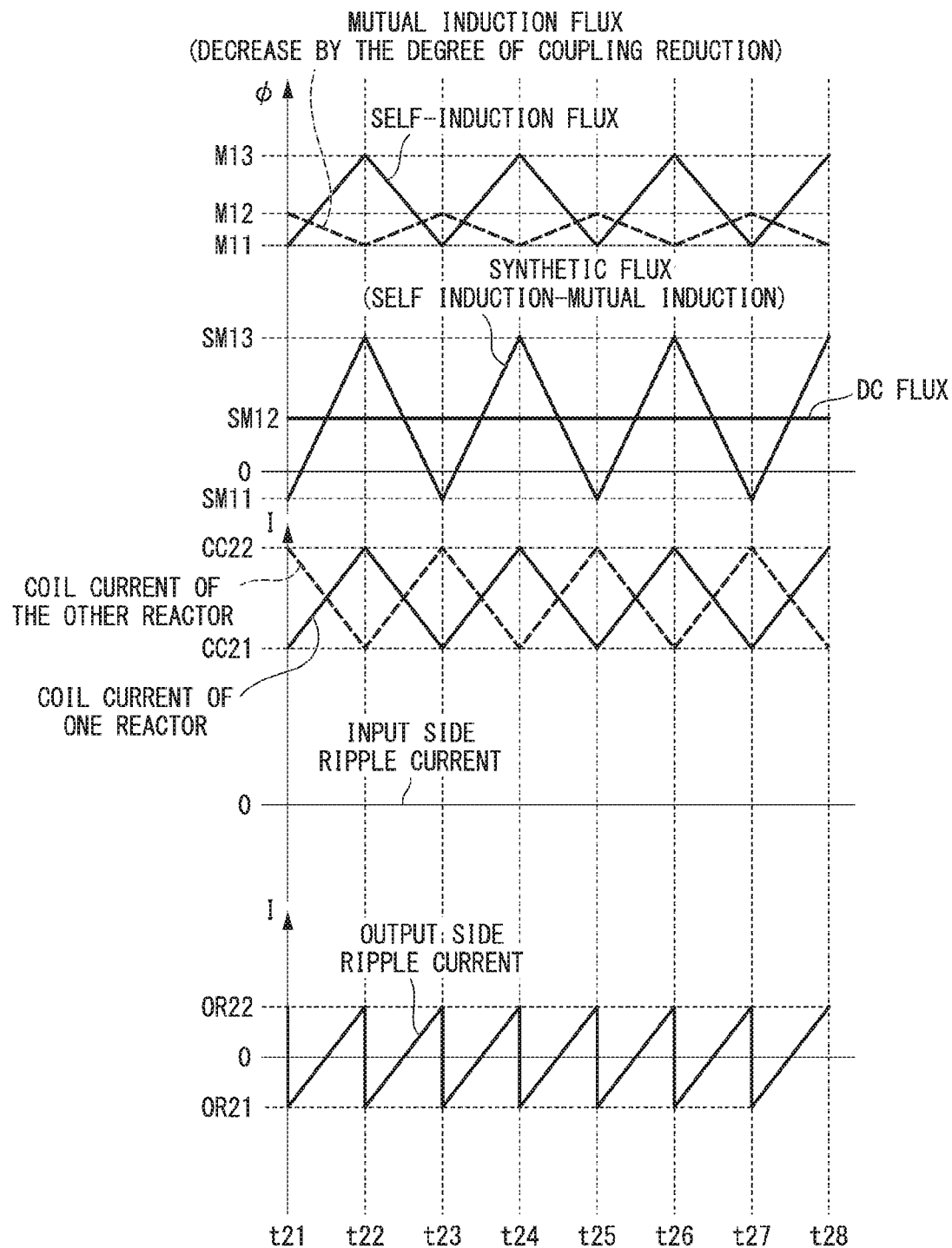
FIG. 11 is a diagram showing self-induced magnetic flux and the like in the case of increasing or decreasing the amount of current supplied to the two reactors constituting the loose coupling reactor (loose coupling magnetic coupling method).

FIG. 11 is a diagram showing self-induced magnetic flux and the like in the case (loose coupling magnetic coupling method) where the amount of current (coil current) to the two reactors constituting the loose coupling reactor is increased or decreased.

In the example shown in FIG. 11, the switching element for controlling the amount of current supplied to one of the reactors is turned on during the period t21 to t22, turned off during the period t22 to t23, turned on during the period t23 to t24, turned off during the period t24 to t25, turned on during the period t25 to t26, turned off during the period t26 to t27, and turned on during the period t27 to t28.

The switching element for controlling the amount of current supplied to the other reactor is turned off during the period t21 to t22, turned on during the period t22 to t23, turned off during the period t23 to t24, turned on during the period t24 to t25, turned off during the period t25 to t26, turned on during the period t26 to t27, and turned off during the period t27 to t28.

In the example shown in FIG. 11, the self-induced magnetic flux increases from the value M11 to the value M13 during the period t21 to t22, decreases from the value M13 to the value M11 during the period t22 to t23, increases from the value M11 to the value M13 during the period t23 to t24, decreases from the value M13 to the value M11 during the period t24 to t25, increases from the value M11 to the value M13 during the period t25 to t26, decreases from the value M13 to the value M11 during the period t26 to t27, and increases from the value M11 to the value M13 during the period t27 to t28.

The mutual induction magnetic flux decreases by the decrease in the degree of coupling as compared to the example shown in FIG. 10. Specifically, the mutual induction magnetic flux decreases from the value M12 to the value M11 during the period t21 to t22, increases from the value M11 to the value M12 during the period t22 to t23, decreases from the value M12 to the value M11 during the period t23 to t24, increases from the value M11 to the value M12 during the period t24 to t25, decreases from the value M12 to the value M11 during the period t25 to t26, increases from the value M11 to the value M12 during the period t26 to t27, and decreases from the value M12 to the value M11 during the period t27 to t28.

As a result, the synthetic magnetic flux (=self-induced magnetic flux−mutually induced magnetic flux) changes from the value SM11 to the value SM13 during the period t21 to t22, changes from the value SM13 to the value SM11 during the period t22 to t23, changes from the value SM11 to the value SM13 during the period t23 to t24, changes from the value SM13 to the value SM11 during the period t24 to t25, changes from the value SM11 to the value SM13 during the period t25 to t26, changes from the value SM13 to the value SM11 during the period t26 to t27, and changes from the value SM11 to the value SM13 during the period t27 to t28.

On the other hand, DC magnetic fluxes generated in the two reactors have a constant value SM12 during the period t21 to t28.

In the example shown in FIG. 11, the conduction amount (coil current) for one of the reactors (left side in FIG. 9B) increases from the value CC21 to the value CC22 during the period t21 to t22, decreases from the value CC22 to the value CC21 during the period t22 to t23, increases from the value CC21 to the value CC22 during the period t23 to t24, decreases from the value CC22 to the value CC21 during the period t24 to t25, increases from the value CC21 to the value CC22 during the period t25 to t26, decreases from the value CC22 to the value CC21 during the period t26 to t27, and increases from the value CC21 to the value CC22 during the period t27 to t28.

The conduction amount (coil current) for the reactor on the other side (right side of FIG. 9B) decreases from the value CC22 to the value CC21 during the period t21 to t22, increases from the value CC21 to the value CC22 during the period t22 to t23, decreases from the value CC22 to the value CC21 during the period t23 to t24, increases from the value CC21 to the value CC22 during the period t24 to t25, decreases from the value CC22 to the value CC21 during the period t25 to t26, increases from the value CC21 to the value CC22 during the period t26 to t27, and decreases from the value CC22 to the value CC21 during the period t27 to t28.

The difference between the amount of current supplied to one of the reactors (coil current) and the amount of current supplied to the other reactor (coil current) is larger than that in the case of the close coupling shown in FIG. 10.

In the example shown in FIG. 11, the input ripple current (the difference between the coil current on the input side of one reactor and the coil current on the input side of the other reactor) has a value of zero (no difference) during the period t21 to t28.

The output side ripple current increases from the value OR21 to the value OR22 during the period t21 to t22, decreases stepwise from the value OR22 to the value OR21 at the time t22, increases from the value OR21 to the value OR22 during the period t22 to t23, decreases stepwise from the value OR22 to the value OR21 at the time t23, increases from the value OR21 to the value OR22 during the period t23 to t24, decreases stepwise from the value OR22 to the value OR21 at the time t24, increases from the value OR21 to the value OR22 during the period t24 to t25, decreases stepwise from the value OR22 to the value OR21 at the time t25, increases from the value OR21 to the value OR22 during the period t25 to t26, decreases stepwise from the value OR22 to the value OR21 at the time t26, increases from the value OR21 to the value OR22 during the period t26 to t27, decreases stepwise from the value OR22 to the value OR21 at the time t27, and increases from the value OR21 to the value OR22 during the period t27 to t28.

The output side ripple current is larger than in the case of the close coupling shown in FIG. 11 (specifically, the difference (OR22−OR21)>the difference (OR12−OR11)).

In the example shown in FIG. 11 (magnetic coupling system of loose coupling), the degree of coupling between the mutual inductions is lower than that in the example shown in FIG. 11. Therefore, in the example shown in FIG. 11, the ripple (output side ripple current) by self-induction for producing a synthetic magnetic flux increases more than that in the example shown in FIG. 10.

In the power supply device 1 of the first embodiment (examples shown in FIG. 2, FIG. 3, FIG. 7 and FIG. 10), the voltage converter C (DC-DC converter) is configured by a magnetic coupling type boost chopper using a tightly coupled reactor. Also, the voltage converter C is driven at a fixed boost ratio at which the interference of self-induction and mutual induction are completely complementary.

Specifically, since the boost ratio of voltage converter C is fixed (fixed step-up), the cell voltage (output voltage per cell) of first power storage device B1 (12V battery) is equal to the cell voltage of second power storage device B2 (36V battery). This is because, as described with reference to FIG. 4B, the relationship in which the SOC of the first power storage device B1 and the SOC of the second power storage device B2 are equal is maintained. As a result, regardless of the state of the first load L1 (12 V load) and the second load L2 (48 V load), the charge/discharge balance of the batteries (the first power storage device B1 and the second power storage device B2) is equally maintained. This is because the current flows in the voltage converter C as it is.

Moreover, in the power supply device 1 of the first embodiment, the first reactor 14 and the second reactor 19 constitute a tightly coupled reactor. Therefore, the DC magnetic flux is canceled, and no DC magnetic flux is generated in the first reactor 14 and the second reactor 19.

Similarly, the third reactor 24 and the fourth reactor 29 constitute a tightly coupled reactor. Therefore, no DC magnetic flux is generated in the third reactor 24 and the fourth reactor 29.

Moreover, in the power supply device 1 of the first embodiment, the interference of the self-induction and the mutual induction in the first reactor 14 and the second reactor 19 is not offset but completely complementary. Therefore, the required self-inductance is halved. Similarly, the interference of the self-induction and the mutual induction in the third reactor 24 and the fourth reactor 29 is not offset but completely complementary. Therefore, the required self-inductance is halved.

Further, in the power supply device 1 of the first embodiment, the complementary behavior of the induced voltage current in the first reactor 14 and the second reactor 19 completely cancels out the input ripple. As a result, the output ripple in the first reactor 14 and the second reactor 19 is minimized. Similarly, the complementary behavior of the induced voltage current in the third reactor 24 and the fourth reactor 29 completely cancels out the input ripple. As a result, the output ripple in the third reactor 24 and the fourth reactor 29 is minimized.

In the power supply device 1 of the first embodiment (examples shown in FIG. 2, FIG. 3, FIG. 7, and FIG. 10), since the second power storage device B2 is a 36 V battery, the battery (specifically, for example, the total weight of the battery) mounted on the power supply device 1 can be reduced as compared with the example shown in FIG. 1 in which the second load L2 (48V load) is operated only by the second power storage device B2 (48V battery)

That is, in the power supply device 1 of the first embodiment, the first power storage device B1 capable of supplying power to the first load L1 is provided. Further, the conversion voltage output from the voltage converter C and applied to the second load L2 is obtained by converting the output voltage of the first power storage device B1, and becomes the sum of the output voltage of the first power storage device B1 and the output voltage of the second power storage device B2.

That is, in the power supply device 1 of the first embodiment, the power stored in the first power storage device B1 can be supplied to the first load L1 (that is, the first load L1 can be driven), and can also be supplied to the second load L2 (that is, the second load L2 can also be driven).

Therefore, in the power supply device 1 of the first embodiment, the first power storage device B1 capable of supplying power to the first load L1 and the second power storage device B2 capable of supplying power to the second load L2 are separately provided. The second power storage device B2 provided (mounted) on the power supply device 1 can be miniaturized than the case (that is, the example shown in FIG. 1) where the electric power stored in the first power storage device B1 is not supplied to the second load L2 when the voltage converter C is not boosted.

In the power supply device 1 of the first embodiment, no magnetic flux is generated by DC in the first reactor 14 and the second reactor 19. Therefore, an inexpensive core material having a low saturation magnetic flux density and a high magnetic permeability can be used in the first reactor 14 and the second reactor 19. Further, since the required self-inductance is halved, the first reactor 14 and the second reactor 19 can be miniaturized and cost-reduced. Similarly, since there is no magnetic flux generation due to DC in the third reactor 24 and the fourth reactor 29, an inexpensive core material having a low saturation magnetic flux density and a high magnetic permeability can be used in the third reactor 24 and the fourth reactor 29. In addition, the third reactor 24 and the fourth reactor 29 can be miniaturized and reduced in cost.

Further, in the power supply device 1 of the first embodiment (examples shown in FIGS. 3 and 10), since there is no ripple at the input, it is possible to eliminate the need for a smoothing capacitor. That is, in the power supply device 1 of the first embodiment, it is not necessary to provide a smoothing capacitor corresponding to the capacitor CL shown in FIG. 1. Even when the capacitor CL is provided, the capacitance of the capacitor can be reduced.

In the example shown in FIG. 3 of the power supply device 1 of the first embodiment, each of the plurality of conversion circuits (the first conversion circuit C1 and the second conversion circuit C2) provided in the voltage converter C is controlled by a fixed boost ratio (two times), and the product (2×2×12 V) of the boost rate of each of the plurality of conversion circuits (first conversion circuit C1, second conversion circuit C2) and the output voltage (12 V) of the first power storage device B1 is equal to the sum (48 V) of the output voltage (12 V) of the first power storage device B1 and the output voltage (36 V) of the second power storage device B2.

That is, in the power supply device 1 of the first embodiment, the product of "the boost ratio of each of the plurality of conversion circuits (the first conversion circuit C1 and the second conversion circuit C2)" which are multiplied by the number of "the plurality of conversion circuits (C1 and C2)" ("Squared" of "2") and "the output voltage (12 V) of the first power storage device B1 is equal to "the sum (48 V) of the output voltage (12 V) of the first power storage device B1 and the output voltage (36 V) of the second power storage device B2".

In another example of the power supply device 1 according to the first embodiment, the boost ratio of the entire voltage converter C can be changed depending on how the boost ratios of the plurality of conversion circuits are set, and the degree of freedom of the combination of the sum of the output voltage of the first power storage device B1 and the output voltage of the second power storage device B2 can be improved.

That is, the following equation holds.

$$(\text{Boost ratio } A \text{ of first conversion circuit C1}) \times (\text{Boost ratio } B \text{ of second conversion circuit C2}) \times Vb1 = Vb1 + Vb2$$

When transforming the above equation, the following equation holds.

$$Vb2 = (A \times B - 1) \times Vb1$$

Here, for example, assuming that the output voltage Vb2 of the second power storage device B2 is N times the output voltage Vb1 of the first power storage device B1, the following equation holds.

$$N = A \times B - 1$$

As described above, N can be appropriately set by the combination of A and B.

Second Embodiment

Hereinafter, a second embodiment of the power supply device of the present invention will be described.

The power supply device 1 of the second embodiment is configured in the same manner as the power supply device 1 of the first embodiment described above, except for the points described later. Therefore, according to the power supply device 1 of the second embodiment, the same effects as those of the power supply device 1 of the first embodiment described above can be obtained except for the points described later.

Figure 12:
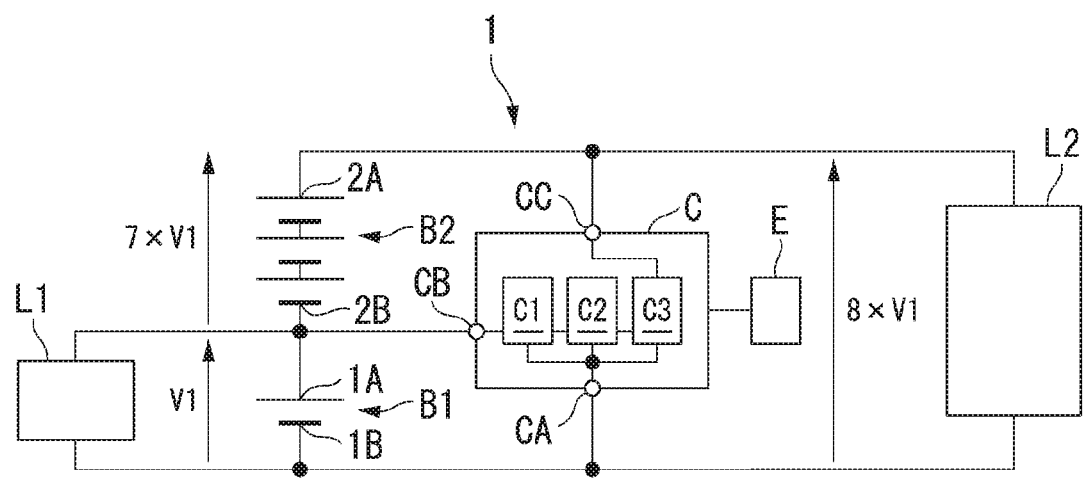
FIG. 12 is a diagram showing an example of a power supply device according to a second embodiment.

FIG. 12 is a view showing an example of the power supply device 1 of the second embodiment.

In the example shown in FIGS. 2 and 3, the second power storage device B2 is a 36V battery, and the second load L2 is a 48V load. On the other hand, in the example shown in FIG. 12, the second power storage device B2 is an 84V battery, and the second load L2 is a 96V load.

In the example shown in FIGS. 2 and 3, the control unit E controls the voltage converter C with a fixed boost rate (four times) so that the converted voltage output by voltage converter C is the sum of the output voltage of first power storage device B1 and the output voltage of second power storage device B2. On the other hand, in the example shown in FIG. 12, the control unit E controls the voltage converter C with a fixed boost rate (eight times) so that the converted voltage output by voltage converter C is the sum of the output voltage of first power storage device B1 and the output voltage of second power storage device B2.

In the example shown in FIG. 12, the sum (96 V) of the output voltage (12 V) of the first power storage device B1 and the output voltage (84 V) of the second power storage device B2 is controlled so that the second load L2 (96 V load) have a voltage in an operable range.

In the example shown in FIG. 3, the voltage converter C includes a first conversion circuit C1 and a second conversion circuit C2. On the other hand, in the example shown in FIG. 12, the voltage converter C includes a first conversion circuit C1, a second conversion circuit C2, and a third conversion circuit C3.

In the example shown in FIG. 12, the first conversion circuit C1 converts (in the example shown in FIG. 12, boost by two times) the output voltage of the first power storage device B1 input between the terminal CA and the terminal CB of the voltage converter C. In detail, the first conversion circuit C1 is controlled by a fixed boost rate (by two times). The second conversion circuit C2 further converts the voltage boosted and output by the first conversion circuit C1 (in the example shown in FIG. 12, boost by two times). The third conversion circuit C3 further converts the voltage boosted and output by the second conversion circuit C2 (in the example shown in FIG. 12, boost by two times). The third conversion circuit C3 is also controlled by the fixed boost ratio (two times). As a result, the output voltage of the first power storage device B1 input between the terminal CA and the terminal CB of the voltage converter C is boosted by eight times (=2×2×2 times) by the first conversion circuit C1, the second conversion circuit C2, and the third conversion circuit C3.

Also in the example shown in FIG. 12, the voltage boosted by the first conversion circuit C1, boosted by the second conversion circuit C2, and boosted and output by the third conversion circuit C3 is smoothed by a capacitor (not shown).

The third conversion circuit C3 is configured in the same manner as the first conversion circuit C1 or the second conversion circuit C2 shown in FIG. 3.

In the example shown in FIG. 12, the product (2×2×2×12 V=96 V) of the boost ratio (two times) of the first conversion circuit C1, the boost ratio (two times) of the second conversion circuit C2, the boost ratio (two times) of the third conversion circuit C3, and the output voltage V1 (12V) of the first power storage device B1 is equal to the sum (8×V1) (12 V+84 V=96 V) of the output voltage V1 (12 V) of the first power storage device B1 and the output voltage (7×V1) (84 V) of the second power storage device B2.

In detail, in the example shown in FIG. 12, the boost ratio of the first conversion circuit C1 is fixed at two times. The boost ratio of the second conversion circuit C2 is fixed at two times. Further, the boost ratio of the third conversion circuit C3 is also fixed at two times. The output voltage (84 V=7×12 V) of the second power storage device B2 is seven times the output voltage (12 V) of the first power storage device B1.

Therefore, in the example shown in FIG. 12, it is not necessary to provide a power storage device having an output voltage that is eight times the output voltage of the first power storage device B1, and it is possible to operate the second load L2 that can be operated with a voltage that is eight times the output voltage of the first power storage device B1.

In the example shown in FIG. 12, the boost ratios of the three boost choppers (the first conversion circuit C1, the second conversion circuit C2 and the third conversion circuit C3) are fixed at two times. Due to the fixed boosting, the ratio of the output voltage of the first power storage device B1 (12 V battery) to the output voltage of the second power storage device B2 (84 V battery) is always constant (1:7).

In the example shown in FIG. 12, the voltage converter C includes three conversion circuits (a first conversion circuit C1, a second conversion circuit C2 and a third conversion circuit C3), but in the other example, the voltage converter C may have four or more conversion circuits.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A power supply device comprising:
a first power storage device capable of supplying power to a first load;
a second power storage device configured to output a voltage higher than an output voltage of the first power storage device and is connected in series to the first power storage device;
a voltage converter connected to an output terminal of the first power storage device and configured to output a converted voltage obtained by voltage converting the output voltage of the first power storage device;
a second load connected to an output terminal of the voltage converter and to which the converted voltage is applied; and
a control unit configured to control the voltage converter at a fixed boost ratio such that the converted voltage is a sum of the output voltage of the first power storage device and an output voltage of the second power storage device,
wherein the output terminal of the first power storage device is connected to the second power storage device,
an output terminal of the second power storage device is connected to the output terminal of the voltage converter,
wherein the voltage converter includes a plurality of conversion circuits, the plurality of conversion circuits include a first conversion circuit and a second conversion circuit, the first conversion circuit includes:
- a first upper arm connected to an intermediate potential line;
- a first lower arm connected to a common potential line;
- a first reactor connected between a first connection point, which is a connection point between the first upper arm and the first lower arm, and the output terminal of the first power storage device;
- a second upper arm connected to the intermediate potential line;
- a second lower arm connected to the common potential line; and
- a second reactor connected between a second connection point, which is a connection point between the second upper arm and the second lower arm, and the output terminal of the first power storage device, and is magnetically coupled to the first reactor, the first conversion circuit converts the output voltage of the first power storage device into a voltage of the intermediate potential line according to the fixed boost ratio, the second conversion circuit includes:
- a third upper arm connected to the output terminal of the voltage converter;
- a third lower arm connected to the common potential line;
- a third reactor connected between a third connection point, which is a connection point between the third upper arm and the third lower arm, and the intermediate potential line;
- a fourth upper arm connected to the output terminal of the voltage converter;
- a fourth lower arm connected to the common potential line; and
- a fourth reactor connected between a fourth connection point, which is a connection point of the fourth upper arm and the fourth lower arm, and the intermediate potential line, and magnetically coupled to the third reactor, the second conversion circuit converts the voltage of the intermediate potential line to the output voltage of the voltage converter by the fixed boost ratio, and a product of the boost ratio of the first conversion circuit, the boost ratio of the second conversion circuit, and the output voltage of the first storage device is equal to the sum of the output voltage of the first storage device and the output voltage of the second storage device.

2. The power supply device according to claim 1, wherein
even when remaining capacities of the first power storage device and the second power storage device change, the control unit maintains a ratio of the output voltage of the first power storage device to the output voltage of the second power storage device constant.

3. The power supply device according to claim 2, wherein
the output voltage of the first power storage device is controlled to be a voltage in a range in which the first load can operate, and
the sum of the output voltage of the first power storage device and the output voltage of the second power storage device is controlled to be a voltage in a range in which the second load can operate.

4. The power supply device according to claim 1, wherein
the boost ratio of the first conversion circuit is fixed at two times,
the boost ratio of the second conversion circuit is fixed at two times, and
the output voltage of the second power storage device is three times the output voltage of the first power storage device.

\* \* \* \* \*